Sept. 25, 1923.
C. S. POOL
1,469,108
CROSS FEED STOP FOR LATHES
Filed Oct. 1, 1920
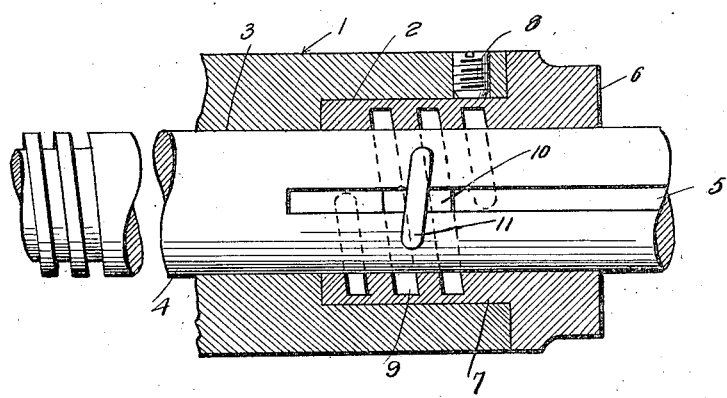
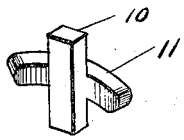
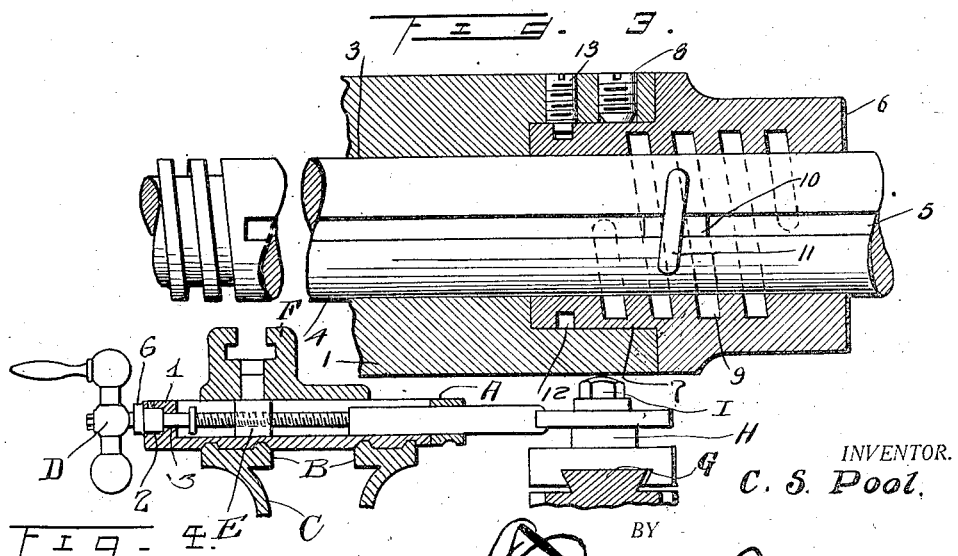
INVENTOR.
C. S. Pool,
BY
ATTORNEY.

Patented Sept. 25, 1923.

1,469,108

UNITED STATES PATENT OFFICE.

CHARLES S. POOL, OF TAFT, CALIFORNIA.

CROSS-FEED STOP FOR LATHES.

Application filed October 1, 1920. Serial No. 414,102.

*To all whom it may concern:*

Be it known that I, CHARLES S. POOL, a citizen of the United States, residing at Taft, in the county of Kern and State of California, have invented certain new and useful Improvements in Cross-Feed Stops for Lathes; and I do hereby declare the following to be a full, clear, and exact description of the invention, such as will enable others skilled in the art to which it appertains to make and use the same.

This invention relates to a cross feed stop particularly for engine lathes designed primarily to afford a positive stop for the manually operable feed screw for the tool as when using a tapering attachment, and a plurality of pieces of work are to be turned or bored to the same extent or size.

Another object is to provide an adjustable collar or barrel in combination with the feed screw and a movable stop fitting into a spiral groove, one in the collar and one in the screw.

Additional objects will appear hereinafter from the description following taken in connection with drawings of one practical embodiment.

In the accompanying drawing:—

Figure 1 is a sectional view of one form of the cross feed screw stop mechanism, Figure 2 is a perspective view of a cross key used in the stop mechanism, Figure 3 is a sectional view of a modified form of the cross feed screw stop mechanism, Figure 4 is view principally in transverse section through the attachment and parts of a lathe to illustrate its use.

In the form of the invention as illustrated in Figure 1 of the drawing, the same consists of a bearing 1 provided at one end with a socket 2. The bearing 1 is further provided with a bore 3 in which the cross feed screw 4 is mounted for sliding and turning movement. The bearing 1 is mounted upon the carriage of the lathe (not shown) in a usual manner. The screw shaft 4 is provided at its side with a longitudinally disposed groove 5. A collar 6 is positioned at the end of the bearing 1 and is provided with a barrel portion 7 which enters the socket 2 and is capable of axial turning movement therein. A headless set screw 8 passes through the bearing 2 and is engageable with the side of the barrel portion 7 to fasten the collar 6 in fixed relation to the bearing 1.

The barrel portion 7 is provided at its inner side with a helical groove 9, the said groove being square in transverse section and having squared or rounded end walls.

A cross key comprising a base arm or block portion 10 fits snugly in the groove 5 of the screw 4 and which may slide therein. Said cross key further includes a block portion or arm 11 which lies in the groove 9 and which may slide therein. The arms 10 and 11 of the key are disposed in cruciform relation with respect to each other.

As an example of the actual use of the stop mechanism, reference should be had to Figure 4. In that figure, it will be noted that the bearing 1 is rigid or integral with a slide or carriage A mounted for longitudinal movement on guides B of a lathe bed C. The manipulating handle for operating the cross feed screw 4 is shown at D and the threads of said screw coact with a nut E depending from a tool post cross slide F resting on the slide A. G designates a guide bar adapted to be disposed at any suitable angle according to the taper desired and longitudinally of which a head H slides and with which the feed screw 4 is adapted to be adjustably connected as at I. Thus with the stock properly centered parallel with the guides of the lathe, operation of the feed screw 4 will cause the tool post F and tool carried thereby to travel in a path parallel to that of the guide bar G, as the tool at the slide F is automatically advanced lengthwise of the machine. Thus the extent of rotation of the feed screw 4 and accordingly the sliding movement of the tool post cross slide F is limited by the coaction of the key with the groove 9.

The invention is particularly useful in connection with a tapering attachment. Screw 4 is manually operable to feed the tool in relation to the work. After the work has been turned or bored to the desired extent, screw 8 is loosened and barrel 6 is turned axially in order that the key will abut the inner end of the groove 9. Thereupon the screw 8 is tightened to maintain the collar or barrel 6 in fixed relation to the bearing 1. The feed screw 4 can then be manually withdrawn or retracted in the usual manner. Subsequent feeding of the screw will permit it to move towards the work until the key engages the inner ends of groove 9. It will thus be seen that the attachment is of particular advantage when a number of pieces of work are to be turned or bored to the same extent or size, because after the first piece of work is finished, the attachment can be set or adjusted in order that the feed screw will move only to the extent necessary to operate on subsequent pieces of work to the same extent or degree. The key is always carried by and movable with the screw 4 in view of the disposition of arm 10 in groove 5, and is also movable in the groove 9.

In the form of the invention as illustrated in Figure 3 of the drawing, the same includes the features and elements hereinbefore described with the addition that the barrel 7 of the collar is provided with an annular groove 12 which may receive the inner end of a dowel screw 13 which passes through the side of the bearing 1 whereby the barrel 7 may rotate in the bearing 1 when the set screw 8 is loosened. The cross key may be positioned at any desired point between the ends of the collar by loosening the set screw 8 and turning the collar so that the portion 11 of the cross key moves along the groove 9 and when the cross key is at a desired position with relation to the collar the set screw 8 is tightened and the parts are adjusted so the tool may be moved to a prescribed extent and with relation to the work that it is operating upon. The collar 6 is in practice provided at its periphery and adjacent the end of the bearing 1 with a series of graduations which may be moved across a mark or point upon the bearing 1 to indicate to the operator the extent of movement imparted to the cross key when the collar 6 is turned as hereinbefore stated.

Having thus described the invention, what I claim is:

1. A cross feed screw stop mechanism comprising a bearing, a screw shaft movably mounted therein and provided at its side with a longitudinally disposed groove, a barrel member axially adjustable in the bearing, means for restraining the barrel member against longitudinal movement with relation to the bearing, said barrel member being provided with a helical groove, and a cross key member having an arm slidably disposed in the groove of the screw shaft and an arm slidably disposed in the helical groove of the barrel member, and said arms being disposed substantially in cruc form relation with respect to each other.

2. A feed stop mechanism comprising a bearing, a feed member mounted in the bearing, a barrel member axially movable in the bearing and provided with a helical groove, and a key carried by the feed member disposed in the groove of the barrel member.

3. A feed stop mechanism comprising a feed member provided with a groove, a barrel member axially adjustable relatively to the feed member and having a groove, a key engaging both of the grooves, one of said grooves being helical.

In testimony whereof I affix my signature in presence of two witnesses.

CHARLES S. POOL.

Witnesses:
 CORA BOSS,
 BIRDIE CODY.